Oct. 9, 1928.
J. Z. A. DENINSON
METHOD OF TESTING VISION
Original Filed May 28, 1921   4 Sheets-Sheet 1
1,686,962
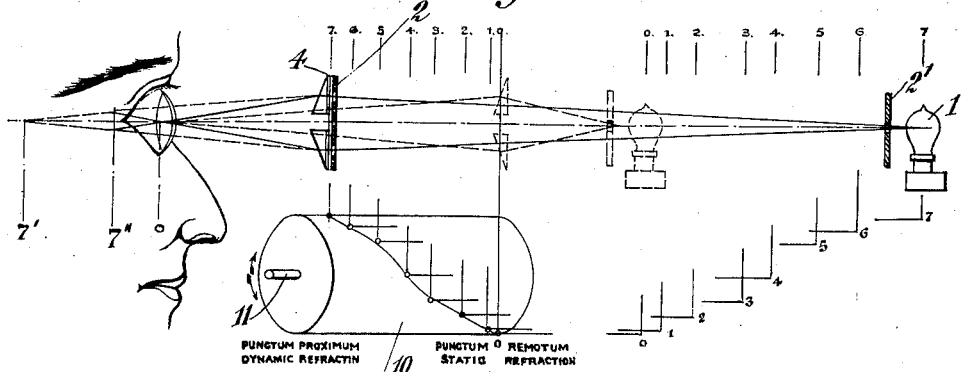
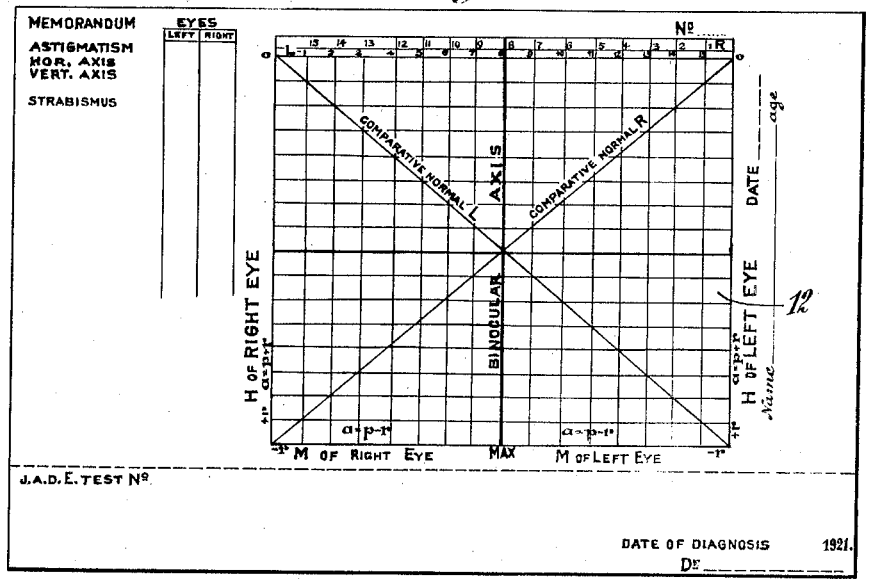
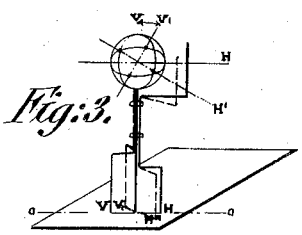
INVENTOR
Jacob Z. A. Deninson
BY
ATTORNEYS

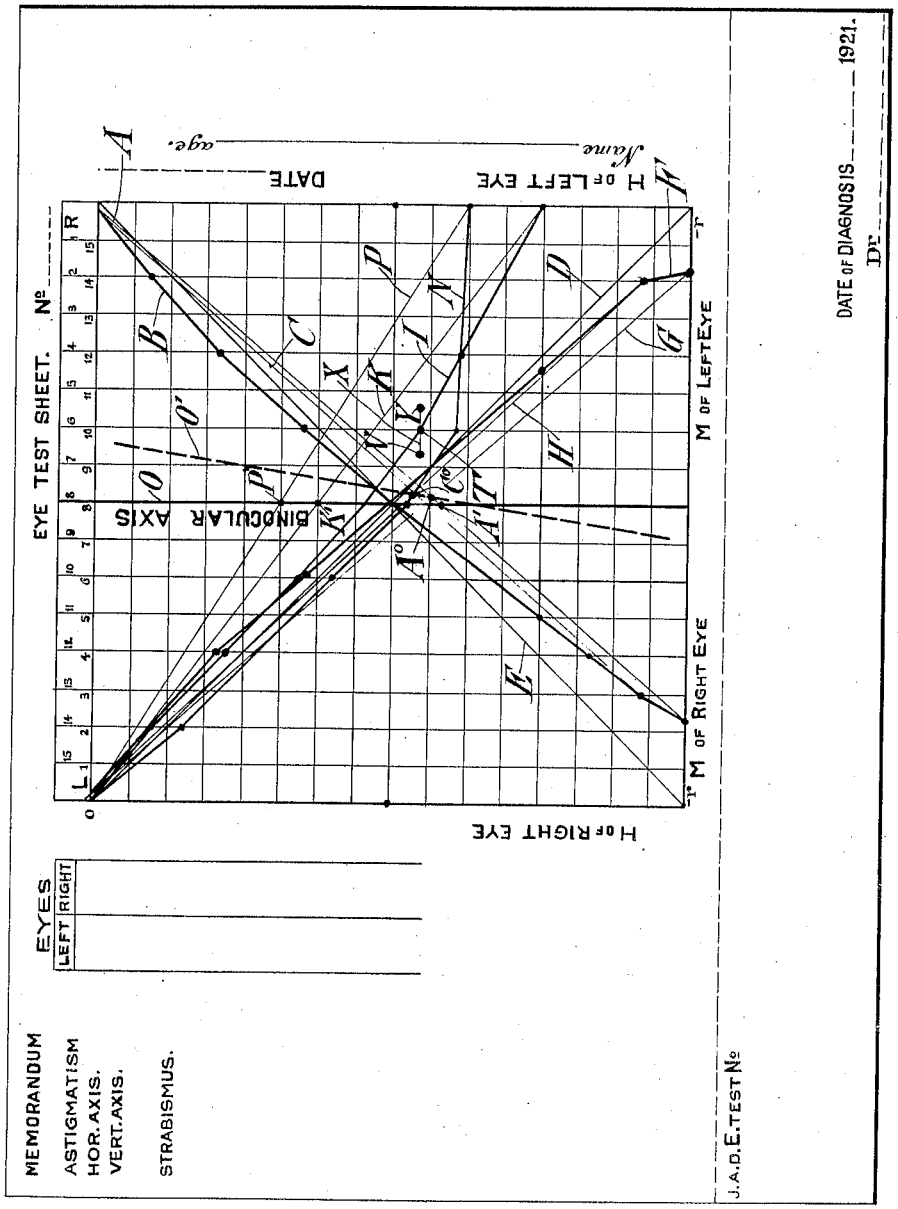

Oct. 9, 1928.

J. Z. A. DENINSON 1,686,962

METHOD OF TESTING VISION

Original Filed May 28, 1921  4 Sheets-Sheet 3

INVENTOR
Jacob Z. A. Deninson
BY
ATTORNEYS

Oct. 9, 1928.
J. Z. A. DENINSON
1,686,962
METHOD OF TESTING VISION
Original Filed May 28, 1921  4 Sheets-Sheet 4
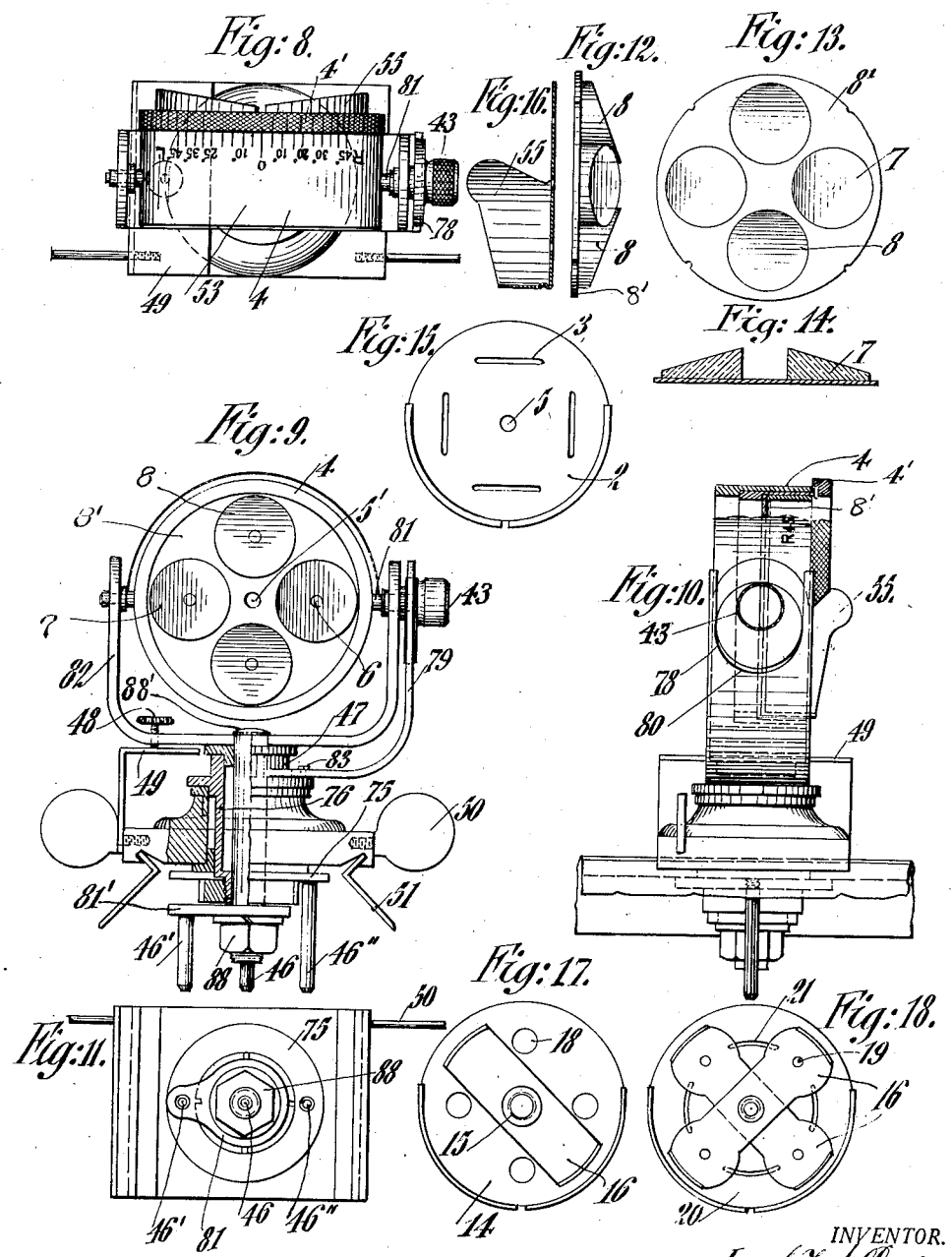
INVENTOR.
Jacob Z. A. Deninson
BY
ATTORNEYS.

Patented Oct. 9, 1928.

1,686,962

UNITED STATES PATENT OFFICE.

JACOB Z. A. DENINSON, OF NEW YORK, N. Y.

METHOD OF TESTING VISION.

Application filed May 28, 1921, Serial No. 473,517. Renewed June 5, 1928.

My invention relates to a new and improved method and instrument for testing the vision.

The defects of vision which can be corrected by optometrical means are astigmatism, strabismus, myopia and hypermetropia and other defects of accommodation. The optometrical instruments which have heretofore been designed and used have depended, in testing the defects in vision, upon a series of graduated lenses or the like which were successively brought in front of the eye of the patient. These instruments could never give absolutely correct results, because they merely informed the physician or optometrist that the defect of the eye of the patient in any particular respect was between one point and another point, corresponding to the two lenses or the like, which the patient stated approximated most closely to correcting his vision.

According to my invention the exact point at which the vision of the patient is properly corrected can be readily ascertained.

Another object of my invention is to provide a method whereby an exact chart of the patient's vision can be supplied to the physician or optometrist.

Another object of my invention is to provide a mechanism whereby the patient himself without being interrogated by the physician can make a consecutive record which will completely inform the physician or optometrist of the condition of his vision.

Another object of my invention is to provide an instrument which will not depend upon a series of expensive and carefully graduated lenses or similar refracting means.

Another object of my invention is to provide an instrument, which by a series of adjustments will give the exact condition of the patient's vision in each and every respect, so that a series of different instruments or attachments will not be necessary.

Other objects of my invention will be set forth in the following description and drawings which illustrate a preferred embodiment thereof.

Fig. 1 is a diagrammatic view illustrating the practical use of my new and improved method and instrument.

Fig. 2 is a view of one of the charts for depicting the vision of the patient.

Fig. 2$^b$ is a chart similar to that shown in Fig. 2 and shows a number of graphs taken as the result of actual tests.

Figure 3 is a diagrammatic view showing how the condition of strabismus or astigmatism can be detected and measured.

Figure 4:
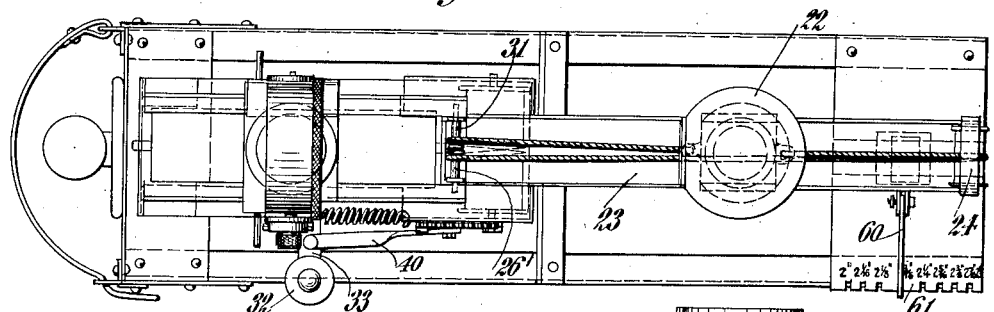

Fig. 4 is a top view of the instrument showing means whereby the patient can make his own record.

Figure 5:
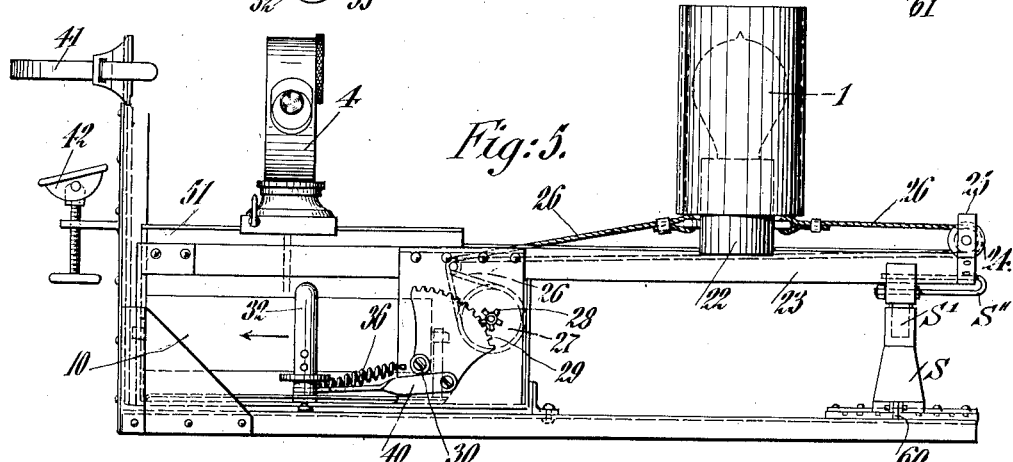

Fig. 5 is an elevation of Fig. 4.

Figure 6:
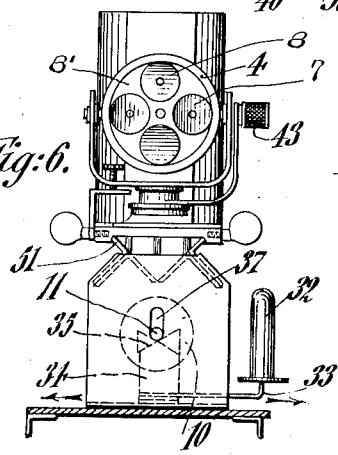

Fig. 6 is an end view of Fig. 5 as seen from the left hand side of Fig. 5, the head support being omitted for the sake of clearness.

Figure 7:
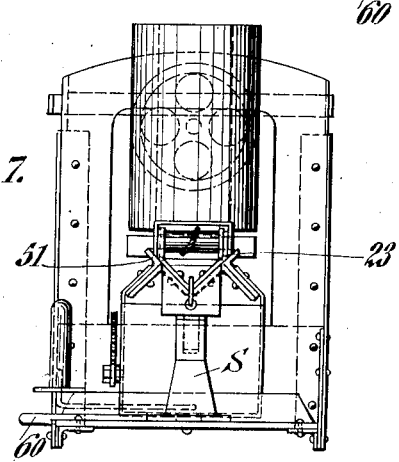

Fig. 7 is also an end view of Fig. 5, but as seen from the right-hand side.

Fig. 8 is a detail top view showing the scale for recording the condition of astigmatism.

Fig. 9 is a front view of Fig. 8.

Fig. 10 is an end view of Fig. 9 taken at the right-hand side of Fig. 9.

Fig. 11 is a bottom view of Fig. 9,

Fig. 12 shows an end view of the prisms used in the instrument.

Fig. 13 is a front view of Fig. 12.

Fig. 14 is a horizontal central section of Fig. 13.

Figure 15 is an elevation of the screen used in my instrument.

Fig. 16 is an end view of Fig. 5.

Fig. 17 is an elevation of a special screen used for testing compound or mixed astigmatism.

Fig. 18 is another embodiment of Fig. 17.

The principle of my invention can be generally seen from the structure shown in Figures 1, 9, 13 and 15. It depends upon the following principle:

The visible object which is used for testing the eyesight of the patient may be any small object whatever, that is rendered visible or luminous by any means whatever. In this particular embodiment illumination is supplied by a small electric lamp 1 of the ordinary incandescent type which can be connected to any suitable source of current. The light emanating from the luminous object 1 which should always be of constant intensity, is caused to pass through the screens 2' and 2 shown in Figs. 1 and 15, so that the light can pass through five openings made in this screen 2. The central opening 5 in screen 2 can be made of any desired diameter, so as to regulate the light supplied to the instrument.

It can be noted that the opening 5 is central, and that the slits 3 are elongated and they are symmetrically disposed with respect to the central opening 5. These slits or openings in the screen or screens can be of any configuration.

A sheet of transparent glass 8' is held in a frame 4 and carries two prisms 7 and two prisms 8, so that as seen in Fig. 9, the center 5' of said circular sheet of glass 8' is on the same line as the center of opening 5 and the centers of the prisms are on the same horizontal lines as the centers of the slits 3. The glass 8' and the four prisms may be ground out of one piece of glass, which is preferably chromatic.

As can be seen from Figs. 12 and 14, the two vertical prisms 8 consist essentially of cylindrical glass members having surfaces which have been cut off by two planes which make equal angles with the optical axis of the instrument. This optical axis may be defined as the horizontal line between the opening in screen 2' and the central opening 5 in the screen 2.

The two horizontal prisms 7 may also be considered as cylindrical glass members which have been cut by two planes which also make equal angles with the optical axis of the instrument. Hence if perpendicular lines were drawn to the inclined faces of the prisms 7 and 8 at the central points of said inclined faces, these four perpendiculars if prolonged, would meet in a common point on the optical axis. In Fig. 1, the prisms are shown adjacent the eye of the observer, but they should be turned together with screen 2, so that the prisms face the light.

Hence as can be seen more particularly in Fig. 1 which shows the lamp 1, the screen 2', and the holder 4 in two different positions, the corresponding positions of the various parts being shown by full lines and dotted lines respectively, if the eye of the observer is properly held, then the said observer will see five images of the luminous opening in screen or diaphragm 2'. Of course, if the patient is suffering from strabismus, he will not see five images but a number less than five, depending upon his condition, but it is preferable to first take up, in explaining this invention, abnormal conditions of the lens of the eye and if the patient is merely suffering from an improper adjustment of the ciliary muscle, there will always be a position in which he will see five images of the dull or luminous object which serves as the means for supplying said images. In the position indicated by the full lines in Fig. 1, the eye of the observer is shown as placed in the position in which he can see the five images of the object.

In order to test the range of accommodation of the patient's ciliary muscle and to detect myopia or hypermetropia, the observer preferably keeps his eye stationary while the parts of the instrument are moved.

In Fig. 1, the position of the eye designated by the line marked "0" shows the position of the lens when the eye is at rest. The position marked 7'' is the position of the retina and the position marked 7' is the point of convergence of the said rays from the inclined faces of the prisms, so that if a white screen were placed in position 7', a single image would be formed.

The screen 2' is preferably always kept at the same distance from the luminous object 1 as clearly appears from Fig. 1, but the holder 4 together with the prisms 7 and 8 and the screen 2 which are all held therein, is now preferably moved through a series of positions as indicated by the corresponding positions 1—7 shown in Fig. 1. In these positions, the point of convergence before mentioned is no longer at the optical center of the patient's lens and so the ciliary muscle of the patient is compelled to exert itself so as to accommodate the lens of the eye in order to enable the patient to still see the five separate images of the object. For example, the holder 4 is first moved to the position indicated by zero in Fig. 1 in beginning the examination and this corresponds to the "punctum remotum", that is, the point in which the ciliary muscle of the normal eye is preferably relaxed, as for example when the patient is gazing at the sky or some very distance object. Of course, the zero position is not the same for each eye, as it depends on the powers of accomodation of the eye examined. The instrument will be provided with a horizontal scale to indicate the movement of the lamp 1 and screen 2 which may be considered as jointly composing a visible object, namely, the opening in screen 2'. At each one of its positions the luminous object will be held stationary, while the holder 4 will have to be moved to a position depending upon the vision of the patient, in order to enable the patient to again see the five images. For example, when the object is held on the zero point of the scale, the operator will move the holder 4 until, for example, in the case of the eye considered as now being examined, the said holder will be moved to the point indicated by zero in Fig. 1. This point will indicate the accommodation for remote vision of the patient.

Underneath the instrument a revoluble cylindrical member 10 will be mounted upon any suitable axle 11 and this may be revolved in opposite directions as indicated by the two arrows shown in Figure 1. This recording member 10 may be provided with an externally located chart of paper or the like, upon which a record may be made. To make the record, the chart shown in Fig. 2 is placed around the recording cylinder 10 and held there by any suitable means. The chart 12 is so mounted on cylinder 10 that the line marked "binocular axis" is parallel to the axle 11, and one of the ends of said chart is on the top line of cylinder 10.

The holder 4 slides to and fro upon a guide or guides 51, or any equivalent means, and the position indicated by zero in Fig. 1 is the furthest point to which the holder 4 can be moved to the right, while the position indicated by 7 in Fig. 1 shows the furthest position to which it is moved to the left, in the case of the particular eye considered as now being examined.

The frame 4 is provided with a vertically held pencil or sharp pointed member 46 or other suitable marking means, and the recording drum 10 can be moved vertically up and down in suitable guideways later to be described, so that when the frame 4 is in any position, the said position can be recorded upon the chart 12 by moving the recording member 10 upwardly when the before mentioned pencil or piercing member or the like, will make a suitable record upon the chart 12. This vertical indicating member is diagrammatically shown in Fig. 1 by the vertical line from 7 in the left scale.

If the holder 4 is at the point marked "zero" in Fig. 1, then the indicating member will make a mark on the chart 12 corresponding to the zero point thereof and this may be the starting point in testing all eyes. The recording cylinder 10 is now revolved about the axle 11 through a certain arc. This arc, of course, will be one-seventh of 360° in this particular instance, but of course, the instrument may be used with any number of graduations on the scale for indicating the movement of the object viewed and with any corresponding turn of the recording cylinder 10. The object viewed is now moved to the position marked 1 and the holder 4 is again moved until the patient sees the five images. In the case of the eye which is considered as being examined, the position "1" of the frame 4 is supposed to correspond to position "1" of the object viewed. The record is again made in the manner before indicated. In this manner, a graph is indicated by means of a series of separated points upon the chart 12 and this graph indicates the condition of the patient's eye. The position of the frame marked "7" indicates the "punctum proximum" or the limit of near vision for the eye supposed to be under examination.

If the patient is suffering from astigmatism he will not see all the four lateral images in the form of a cross until the proper adjustment is made of the slits 3 in the screen 2. In order to determine the correction astigmatism the special screens shown in Figs. 17 and 18 may be used. One of the screens shown in Figs. 17 and 18 can be substituted for the screen 2 shown in Fig. 1 in frame 4. The screen 14 shown in Fig. 17, which may be called the astigmatism screen, is provided with a hollow axle member and it fits into the frame 4'. An opaque member 16 made of sheet metal or the like, is revolubly mounted by means of the hollow axle member 15 on the screen 14 so that the light can still pass through the prisms. The screen 14 is provided with four holes 18 which register with the central portions of the prisms. By revolving the opaque member 16, the illumination can be cut off from either the two vertical openings 18 or the two horizontal openings 18.

If the patient is astigmatic, then he will not see the lateral images along two perpendicular lines, but he will see them along lines which are relatively inclined toward each other. By revolving the annular holder 4' which carries the prisms and screen and is mounted in frame 4, the four lateral images finally designate two perpendicular lines, and the amount of turn necessary to produce this, and which measures the astigmatism, can be seen from the scale 53 on frame 4 shown in Fig. 8.

In the screen 20 shown in Fig. 18, there are two opaque members 16 mounted as before mentioned and these are perforated at 19 and the supplemental screen 20 shown in Fig. 18 is provided with four arcuate slits 21. The central points of the arcuate slits 21 correspond to the central points of the prisms 4, since to make the completed test for astigmatism the screen 2 is replaced by the screen 20. By properly disposing openings 19, astigmatism is corrected and other tests can be made.

In order to test for strabismus, the frame 4 is turned around either on a horizontal or a vertical axis and the amount of the turning may be indicated by scales until the five images are seen by the patient. This is diagrammatically illustrated in Fig. 3.

The specific mechanism for putting into practice the principles and methods before mentioned, is shown in Figs. 4–11. The object is mounted upon a base 22 which can slide to and fro upon a suitable guideway 23. The guideway 23 is provided at the rear thereof with a pulley 24 mounted in a bracket 25. A cord 26 is secured to the rear end of the base 22 and this passes around the pulley 24 and then around pulley 26' and the drum 27, the axle of which is provided with a sprocket 28 that meshes with the broken spur gear 29. The sprocket 28 is connected to its shaft by any conventional clutch or pawl and ratchet construction, so that it engages and turns said shaft when revolved in one direction and does not engage it when revolved in the other direction. The spur gear 29 revolves around the axle 30. At the front of the frame 22 the other end of the rope or similar member 26 is secured. The other end of the rope 26 is secured to the front of the frame 22 and this runs around the pulley 31.

Hence the frame 22 can be moved away from the head rest by revolving spur gear 29.

The patient can manipulate the handle 32 in the direction of the arrow shown in Fig. 5, this direction being upward from the plane of the paper in Fig. 6 and perpendicular thereto. The handle 32 is secured to an arm 33 which is also connected to a shaft upon which the revoluble cam member 34 is mounted. This cam member 34 has an arcuate inclined face 35 at the end thereof, so that when the cam member 34 is revolved, the drum 10 is raised since this drum 10 has its axle 11 in contact with the cam 35, so that the drum 10 can revolve and can also be raised by the movement of handle 32. A spring 36 is provided to automatically return the handle 32 and hence return drum 10 to its lower position when the operator releases the handle 32.

The arm 33 is also connected to the arm 40 which is pivotally connected to the gear 29, so that when the patient operates the handle 32, he automatically moves the lamp and this makes his own record upon the drum 10. The patient can also move the frame 4 and in this manner he can make a complete record of the condition of his own eye. This enables the examination of the patient to be completed without being compelled to ask any questions, and this is extremely convenient if the patient is deaf.

In order to provide for differences between the pupils of the eyes of various persons, the following adjustment is provided:

The rail 23 is mounted upon a pin S' which is pivotally mounted on a movable support S, the said support S being provided with an index member 60 which cooperates with a scale 61 at the base of the instrument.

The instrument is provided at the head rest portion with a large opening through which the object can be seen by both eyes of the patient, but a suitable screen or the like will be provided as is well known, to shut off the light from the eyes of the patient.

It is obvious that if the pupils of the patient are closer together than the normal or standard that the visual angle for an object at a given distance from the patient will be smaller than the normal, and similarly if the pupils are further apart than the normal, this horizontal visual angle will be greater.

As can be seen more particularly in Fig. 5, the rail or guide 23 is connected to the pin S' by means of a curved slide S'' which can slide freely to and fro within the rail or guide 23 and is secured to a head attached to the pin S'.

Hence the guide 23 and all the parts mounted thereon or connected thereto, such as the lamp and the frame, for example, can be swung vertically around the pin S' and by moving the support to and fro, the distance of the pivot point S' from the eye of the patient can be varied, this distance being made smaller if the pupils of his eyes are too close together and vice versa.

Hence the guide 23 and the parts mounted thereon and secured thereto, are swung from one eye of the patient to the other, the eye of the patient which is not being tested being, of course, prevented from seeing.

When the chart shown in Fig. 2 and upon a larger scale in Fig. $2^b$ is to be used for making a record or graph of the condition of the patient's eyesight, so as to determine whether he is near-sighted or far-sighted and the direction of the binocular axis or other general conditions of the eye, said chart is placed so that either the left side or the right side thereof as seen in Fig. 2 for example coincides with the top of the cylinder 10 as illustrated in Fig. 1.

For example, if it is desired to test the right eye of the patient, then the right side of the chart 12 shown in Fig. 2 and which is marked "R" is placed at the top of the cylinder and the cylinder is revolved clockwise as seen by an observer standing at the left of the said cylinder in Fig. 1. Of course, the chart is laid upon the left side of the cylinder 10 as seen by an observer in the said position.

If it is desired to test the left eye of the patient, then the end of the chart which is marked "L" in Fig. 2 for example, is placed at the top of the cylinder 10 as represented in Fig. 1, and the chart is now laid over the right hand side of the cylinder, as seen by an observer in the said position and the cylinder 10 is now revolved counterclockwise.

The phrases "H of right eye" and "H of left eye" appearing at the sides of the chart in Fig. 2, denote the fact that the ordinates of this chart measure the degree of hypermetropia. The expressions "M of right eye" and "M of left eye" at the bottom of the chart indicate the fact that the abscissas indicate the degree of myopia.

The horizontal line shown in the center of the chart in Fig. 2 conveniently enables the operator to determine the upper and lower halves of the chart.

The equation $a = p - r$ is simply a duplication of the well known equation of Donders where $a$ equals the number of diopters representing the accommodation, $p$ equals the number of diopters represented by the eye when in a state of maximum refraction, that is, at the punctum proximum and $r$ equals the number of diopters represented by the eye in a condition of rest, that is, at the punctum remotum. Hence $p$ equals the dynamic refraction of the eye and $r$ the static refraction.

The vertical lines on the chart correspond to the successive positions in which the object viewed can be placed. There are sixteen positions thus indicated in the chart shown in Fig. $2^b$, showing that the object viewed can be placed in a greater number of successive positions than in the diagrammatic representation shown in Fig. 1. The horizontal lines of the chart shown in Fig. 2 for example, conveniently enable the operator to judge the character of the graph secured.

In Fig. 2^b a number of graphs are illustrated which have been taken from actual practice.

For example, the graph B indicates a myopic right eye and the graph F indicates a myopic left eye of the same man. The operator can immediately ascertain the fact that the eyes thus tested are myopic because these graphs are inclined downwardly quite sharply and their bottom points are considerably below the middle horizontal line of the chart.

It is very important in order to correctly accommodate for the defects in vision, to ascertain the true binocular axis. This is determined by the varying powers at varying distances of the two eyes of the patient. To determine the binocular axis, I take for purposes of comparison, the central vertical line of the chart shown in Fig. 2^b for example, and which is marked "Binocular axis." The dotted line 0' is compared with this line 0 thus taken as a standard to determine the principal binocular axis and it is secured as follows:

The line G is drawn between the two ends of the graph F and a similar line C is drawn between the two ends of the graph B. These intersect in the point C°.

A similar line H is now drawn between the starting point of graph F and the point of said graph immediately preceding the end point thereof. A similar line A is now drawn to a corresponding preceding point on the graph B. The lines G and A intersect in the point A° and the line 0' can now be secured by drawing a line connecting the points A° and C° and the angle between the line 0 and 0' indicates the deviation of the principal binocular axis of the patient.

Other tests made of a child eleven years of age having perfect vision resulted as follows:

The graph N was secured when the child viewed a black dot on a sheet of paper as different results are secured when the patient's vision is forced by means of a bright luminous object. The graph I was secured when the said patient looked at a luminous object such as the screen having the luminous slit illuminated by the electric light before mentioned. These graphs illustrate that when the eye is looking at a bright light the pupil contracts and therefore the accommodation of the eye is changed. Its refractive powers are changed by the contraction of the pupil in order to prevent too much light entering the eye and irritating or injuring the nerves.

The point P' which is the intersection of the line P with the axis 0, indicates the accommodative powers of the eye when gazing at a relatively dull object and the point K' formed by the intersection of the line K with the axis 0, indicates the accommodative powers of the eye when gazing at a relatively bright and luminous object. Since both eyes of the child were perfect, these two points were the same in both eyes and hence the binocular axis would coincide with the line 0. The line having the two ends V and Y which is parallel to the horizontal lines of the chart is a graph showing that the child was suffering from neither strabismus nor astigmatism and that the monocular axis of either eye did not deviate in any direction.

It makes no difference for the purposes of my invention if the said line would be in any other part of the chart and the length thereof could correspond to the distance between the two pencils or other indicating means 46' and 46'' which are adjacent the member 46 before mentioned.

As indicated diagrammatically in Fig. 3, these members 46' and 46'' indicate the movement of the prisms before mentioned in order to determine strabismus or astigmatism.

As before mentioned, the astigmatism of the patient is determined by revolving the frame containing the lenses around a central imaginary axis which is perpendicular to the plane of the paper in Fig. 9.

In order to determine strabismus it is necessary to be able to revolve the said frame about the two other fundamental axes as indicated in Fig. 3, and the members 46' and 46'' are provided so as to record the movement of the said frame on the said two axes. Thus the pencil 46' which is mounted upon the crosspiece 81' is connected by clamping nut 88 to vertical member 88', and by said member 88' to the U-shaped frame member 82, whereby when the set screw 48 is loosened from member 49 and the frame 4 is revolved about the vertical axis located in the plane of the paper in Fig. 9, the said pencil 46' describes an arc which can be recorded on the chart on cylinder 10. When the pencil 46' is being thus actuated, the paper is around the drum as before mentioned, and a series of points can be secured by upwardly moving the cylinder 10 as before mentioned, but the graph described by the pencil or similar member 46' does not run parallel to the top line of the cylinder 10 or to the axis thereof but instead runs in a direction substantially perpendicular thereto.

In order to determine the compound strabismus and as indicated in Fig. 3, it is necessary to indicate and record the revolution of the frame 4 containing the prisms, around a horizontal axis parallel to the plane of the paper in Fig. 9. For this purpose, the frame 4 is mounted on a horizontal shaft 81 which can be revolved by means of the knurled knob 43. This knob 43 is provided with an eccentric 78 which is rigid with the said shaft 81 on which the frame 4 is mounted. An angle arm 79 is provided with a perforation 80 with which said eccentric 78 cooperates so that said arm 79 is revolved about a vertical axis in the plane of the paper of Fig. 9, when the knob 43 is turned.

When arm 79 is thus actuated by the eccentric 78, it causes the revolution of the member 76 about a vertical axis in the plane of the paper in Fig. 9, because the member 79 is secured to member 76 by a stud or rivet 83. The pencil or similar member 46″ is connected to the cross-piece 75 into which the frame member 76 is pressed so that the two move together.

By means of this mechanism, the pencils 46′ and 46″ move when the frame member 4 and the prims are revolved about a vertical axis in the plane of Fig. 9 and the pencil or similar member 46″ alone moves when the frame 4 is revolved about a horizontal axis in Fig. 9.

A graph illustrating hypermetropia on the chart begins from the zero point as all the graphs start from this point but instead of bending down to the bottom of the chart, it would end relatively much nearer to the central horizontal line of the chart.

The operator can be provided with a chart similar to that shown in Fig. 2, but made of transparent material such as celluloid and having various indicia marked thereon, so that by placing said celluloid chart on the test chart the operator can ascertain the defects in the accommodation of the eye or eyes tested.

The diagonal lines seen on the chart 12 in Fig. 2 are derived as follows:

If a white screen is placed at the position marked 0 adjacent the eye of the patient in Fig. 1 and the lamp is held at the position marked 0 on the lamp scale, then the holder can be moved to a position in which a single luminous point will be visible upon the said screen, this point being the result of the convergence of the five pencils of light that pass through the five openings in the screen 2.

If now the luminous object is moved to the position marked 1 on the lamp scale, then the holder having the prisms therein will have to be moved to the left of the first position in order to produce the single luminous point before mentioned. In this manner a series of records can be made upon a chart suitably placed upon the cylinder 10 as before mentioned, but the test is now being made with a white screen instead of the eye of the patient.

If now, the successive distances between the holder, and the said white screen be reduced to inches or diopters these diopters can be used for indicating the ordinates of the said chart. The zero axis can be the top horizontal line shown in Fig. 2. The distance in inches or diopters which the luminous object is moved from the original zero position can be laid as abscissas on the said chart, the zero line being the left-hand line or the right-hand line of the said chart.

Experiments have shown that the graphs illustrating the movement of the said holder 4 for a given set of prisms have a definite angle, is indicated by the diagonal lines drawn on the chart in Fig. 2, one of these lines being drawn for purposes of comparison with the left eye of the patient, and the other line being drawn for purposes of comparison with the right eye of the patient and these two lines are designated as comparative normal lines.

It will be noted that as the test is made, the object viewed is further and further removed from the eye and the angle of the converging pencils of light when they pass to the lens of the eye becomes greater and greater, and this angle is greatest at the punctum proximum which reproduces the exact conditions of actual vision.

If in making the test the angle between the upper and lower pencils of light issuing from the luminous object is measured, at each interval, and the angle of the said pencils or beams of light after they have passed through the prisms is also measured, then the difference between the two angles shows the accommodation effort of the eye, whether muscular or refractive. At the region or zone of poorest vision, the patient's eye will show the least variation in accommodation, for a given movement of the object viewed.

For example, in an actual test made with the luminous point, and with prisms of a given angle, when the luminous object was eleven inches away from the prisms, the upper and lower pencils of light to the centers of the upper and lower prisms made an angle of 10° 28′. After passing through the said prisms, these rays of light had an angle of 9° 34′. Hence the eye tested had to display an accommodative power of 54′.

When the luminous object was twelve inches away the angle made by the said beams of light falling upon the prisms was 9° 34′ and the angle of the beams of light refracted by the prisms was 10° 28′ so that the accommodative power was now minus 54′. This last-mentioned test was made with a perfect eye, namely, the eye of the child of eleven years of age before-mentioned, and hence this point of zero accommodation of the eye would occur at different parts of the test, depending as to whether the patient was myopic or hypermetropic.

Conventional mechanism such as a broken gear on shaft 11 and a vertical rack which engaged the said gear only when said shaft was moved by the cam could be used for automatically revolving said shaft.

Although in most cases, the position of the eye will be between the point of convergence of the light rays and the prisms, in some tests, it may be necessary to have the said eye at a definite distance to the left of the said point of convergence 7′, in order to be able to see the five images, It is understood that although I have shown prisms or refractive bodies for creating the series of images, that any other equivalent optical means may be used for creating a series of images.

Since the glass used for the refracting bodies is preferably chromatic, images are formed in a series of colors so that a suitable test can be made if the eye of the patient is color blind to one or more colors.

The chart shown in Fig. 2$^b$ has its ordinates and abscissas in inches, although of course they could express diopters. To find the limit of binocular accommodation, beyond which the eyes squint, chords A and G are drawn to graphs B and F, which illustrate the abnormal eyes tested. The binocular axis 0' is determined as before described. The length of the projection of 0' on 0 from their point of intersection to the point of intersection of 0' with A and G expresses said limit of binocular accommodation. If the chart were drawn in a scale of diopters, then the graphs would be substantially straight lines, coinciding with said chords, so that it would not be necessary to draw them.

I have shown preferred embodiments of my invention, but it is clear that numerous changes and omissions could be made without departing from its spirit.

I claim:

1. A method of testing the refractive power of an eye which consists in causing an object to create a series of images by causing the light rays issuing from said object to be separated by bodies which change the directions of said rays and then moving the said object and said bodies through a series of consecutive positions at each of which the eye of the patient is kept in substantially the same position to view the said series of images.

2. A method of testing the refractive powers of an eye which consists in causing the light rays from an object to pass through a series of prisms symmetrically disposed with respect to a central point and also permitting the said light rays to pass through said central point, and then moving the said object and the said prisms through a series of consecutive positions while the eye of the patient is held in substantially the same position, the consecutive positions of the said prisms being determined by the point at which the eye of the patient will successively perceive the said series of images.

3. In the art of testing the refractive powers of an eye, that step in the art which consists in successively varying the angle of the light rays which enter the eye during the testing of the refractive powers thereof, so that the successive angles form a series.

4. In the art of testing vision, that step in the art which consists in causing an object to produce a series of images by means of refracting bodies, moving the said object to a series of consecutive positions, moving the said refracting bodies to a series of consecutive positions while the eye of the patient is held substantially stationary for seeing the said images, and recording each position of the said refracting bodies upon a chart which is moved in a direction transverse to the movement of said refracting bodies, each said transverse movement of the said chart corresponding to the movement of the said object, whereby a graph is secured to illustrate the condition of the eye.

5. In the art of testing vision by causing the eye which is being tested to view a series of images produced by passing beams of light through a series of bodies, that step in the art which consists in determining strabismus by revolving the said refracting bodies until the eye being tested sees a maximum number of images.

6. In the art of testing vision by causing the eye which is being tested to view a series of images produced by causing the light issuing from an object to pass through a series of refracting bodies, that step in the art which consists in recording the condition of strabismus by revolving the said refracting bodies until the eye which is being tested sees a maximum number of images, and recording the movement of the said refracting bodies.

7. In the art of detecting vision, that step in the art which consists in determining the axis of astigmatism of the patient by causing the eye of the patient to view a series of images produced by causing the light issuing from the object viewed, to pass through a series of refracting bodies and separately destroying pairs of such images by suitably shutting off the light rays transmitted to said refracting bodies to the eyes of the patient.

8. In the art of testing vision, that step in the art which consists in recording a series of points according to the method of claim 4 upon a chart whose ordinates and whose abscissas are expressed in diopters.

9. In the art of testing vision, that step in the art which consists in recording a series of points according to the method of claim 4 upon a chart, the diagonal lines of which chart are graphs expressing the relationship between the position of the luminous object and the point of convergence of the light rays which have passed through the said refracting bodies.

10. A method of testing the refractive power of an eye according to claim 1, which consists in causing the said light rays to pass through a series of refracting bodies made of chromatic glass.

11. A method of determining the true binocular axis of a patient's eyes, which consists in producing graphs illustrating the condition of the said eyes according to the method of claim 4 so that the said graphs intersect each other, and then connecting the ends of the said graphs with a series of like points on each of said graphs, whereby the true binocular axis can be found by connecting the points of intersection of the said connecting lines.

12. A method of determining the limit of binocular accommodation of a person which consists in causing an object to produce a series of images by means of refracting bodies, moving the said object to a series of consecutive positions, moving the said refracting bodies to a series of consecutive positions while the eye of the patient is held substantially stationary for seeing the said images, recording each position of the said refracting bodies by means of points upon a chart which is moved in a direction transverse to the movement of the said refracting bodies, connecting the corresponding points by means of lines to produce on said chart diagonal intersecting and symmetrically located graphs expressing the relationship between the position of the luminous object and the point of convergence of the light rays which have passed through the said refracting bodies, determining the true binocular axis, and projecting on the normal binocular axis that length of said true binocular axis which is between the intersection of said axes and the intersection of said true binocular axis with the chords of said graphs.

In testimony whereof I hereunto affix my signature.

JACOB Z. A. DENINSON.